United States Patent

Kanade et al.

[11] Patent Number: 6,084,979
[45] Date of Patent: *Jul. 4, 2000

[54] METHOD FOR CREATING VIRTUAL REALITY

[75] Inventors: Takeo Kanade, Pittsburgh, Pa.; P. J. Narayanan, Calicut Kerala, India; Peter W. Rander, Pittsburgh, Pa.

[73] Assignee: Carnegie Mellon University, Pittsburgh, Pa.

[ * ] Notice: This patent issued on a continued prosecution application filed under 37 CFR 1.53(d), and is subject to the twenty year patent term provisions of 35 U.S.C. 154(a)(2).

[21] Appl. No.: 08/671,791

[22] Filed: Jun. 20, 1996

[51] Int. Cl.[7] ................................. G06T 17/00
[52] U.S. Cl. ................. 382/154; 382/285; 345/424; 345/425; 348/48
[58] Field of Search .................. 382/103, 106, 382/153, 154, 173, 275, 100, 285, 293; 345/125, 419, 420, 421, 422, 423, 424, 425, 426, 427, 358; 348/42, 47, 48, 552; 434/23, 26, 37, 47, 79, 32, 63; 463/31, 32, 33; 364/468.04

[56] References Cited

U.S. PATENT DOCUMENTS

| | | | |
|---|---|---|---|
| 4,860,123 | 8/1989 | McCalley et al. | 358/342 |
| 4,905,094 | 2/1990 | Pocock et al. | 358/342 |
| 4,987,554 | 1/1991 | Kaufman | 364/522 |
| 5,065,252 | 11/1991 | Yoshio et al. | 358/335 |
| 5,247,651 | 9/1993 | Clarisse | 395/500 |
| 5,320,538 | 6/1994 | Baum | 434/307 |
| 5,442,456 | 8/1995 | Hansen | 358/432 |
| 5,452,435 | 9/1995 | Malouf et al. | 395/500 |
| 5,499,146 | 3/1996 | Donahue et al. | 360/33.1 |
| 5,617,334 | 4/1997 | Tseng et al. | 364/715.02 |
| 5,619,337 | 4/1997 | Naimpally | 386/83 |
| 5,675,377 | 10/1997 | Gibas | 348/47 |
| 5,714,997 | 2/1998 | Anderson | 348/39 |
| 5,745,126 | 4/1998 | Jain et al. | 345/952 |
| 5,850,352 | 12/1998 | Moezzi et al. | 364/514 A |
| 5,852,672 | 12/1998 | Lu | 382/154 |
| 5,953,054 | 9/1999 | Mercier | 348/50 |

OTHER PUBLICATIONS

Robert Skerjanc, Combined Motion and Depth Estimation based on Mulitocular Image Sequences for 3DTV, SPIE vol. 2177, pp. 35–44, Jul. 1994.

Steven J. Gortler et al., The Lumigraph, Computer Graphics Proceedings, Annual Conference Series, 1996, pp. 43–54, Apr. 1996.

N. L. Chang et al., Arbitrary View Generation for Three-Dimensional Scenes from Uncalibrated Video Cameras, International Conference on Acoutics, Speech, and Signal Processing, vol. 4, pp. 2455–2458, May 1995.

(List continued on next page.)

*Primary Examiner*—Leo H. Boudreau
*Assistant Examiner*—Brian P. Werner
*Attorney, Agent, or Firm*—Kirkpatrick & Lockhart LLP

[57] ABSTRACT

A method of virtualizing reality, i.e., a method of creating virtual reality from images of a real event, is comprised of the steps of capturing a plurality of images of each time instant of a real event using a plurality of cameras positioned at a plurality of angles. Each image is stored as intensity and/or color information. A suitable internal representation is computed from these images and the information regarding the camera angles. An image of each time instant may be generated from any viewing angle using the internal representation of it. The virtual viewpoints could be displayed on a single TV screen or using a stereoscopic display device for a true three-dimensional effect. The event thus virtualized can be navigated through, and interacted with, any virtual reality system.

14 Claims, 16 Drawing Sheets

OTHER PUBLICATIONS

Narayanan, et al., "Synchronous Capture of Image Sequences from Multiple Cameras", CMU Technical Report CMU–RI–TR–95–25, Dec. 1995.

Hilton, A., "On Reliable Surface Reconstruction from Multiple Range Images", University of Surry Technical Report VSSP–TR–5/95, Oct. 1995.

David A. Simon et al., Real–Time 3–D Pose Estimation Using a High–Speed Range Sensor, Robotics and Automation, 1994 IEEE International Conference, p.p. 2235–2241, 1994.

Satoh et al., "Passive Depth Acquisition for 3D Image Displays," IEICE Trans. Inf. & Syst., vol. E77–D, No. 9, pp. 949–957, Sep. 1994.

Robert Skerjanc, *Combined Motion and Depth Estimation Based on Multiocular Image Sequences for 3DTV*, Proceedings of SPIE, Conference #20585, p.p. 35–44, Jul. 1994.

Steven J. Gortler et al., *The Lumigraph*, Siggraph 96, Aug. 4–9, 1996, p.p. 43–54.

Leonard McMillan & Gary Bishop, *Plenoptic Modeling: An Image–Based Rendering System*, Siggraph 95, Aug. 6, 1995, pp. 39–46.

Roger Y. Tsai, "A Versatile Camera Calibration Technique for High–Accuracy 3D Machine Vision Metrology Using Off–the–Shelf TV Cameras and Lenses"—IEEE Journal of Robotics and Automation, vol. RA–3, No. 4, Aug. 1987.

Masatoshi Okutomi, "A Multiple–Baseline Stere"—IEEE Transactions on Pattern Analysis and Machine Intelligence, vol. 15, No. 4, Apr. 1993.

William E. Lorensen, Harvey E. Cline, "Marching Cubes: A High Resolution 3D Surface Construction Algorithm"—Computer Graphics, vol. 21, No. 4, Jul. 1987.

Takeo Kanade, "User Viewpoint"—MasPar News, vol. 2, No. 2, Nov. 1991.

Hugues Hoppe, Tony DeRose, Tom Duchamp, Mark Halstead, Hubert Jin, John McDonald, Jean Schweitzer, Werner Stuetzle, "Piecewise Smooth Surface Reconstruction", Computer Graphics SIGGRAPH '94.

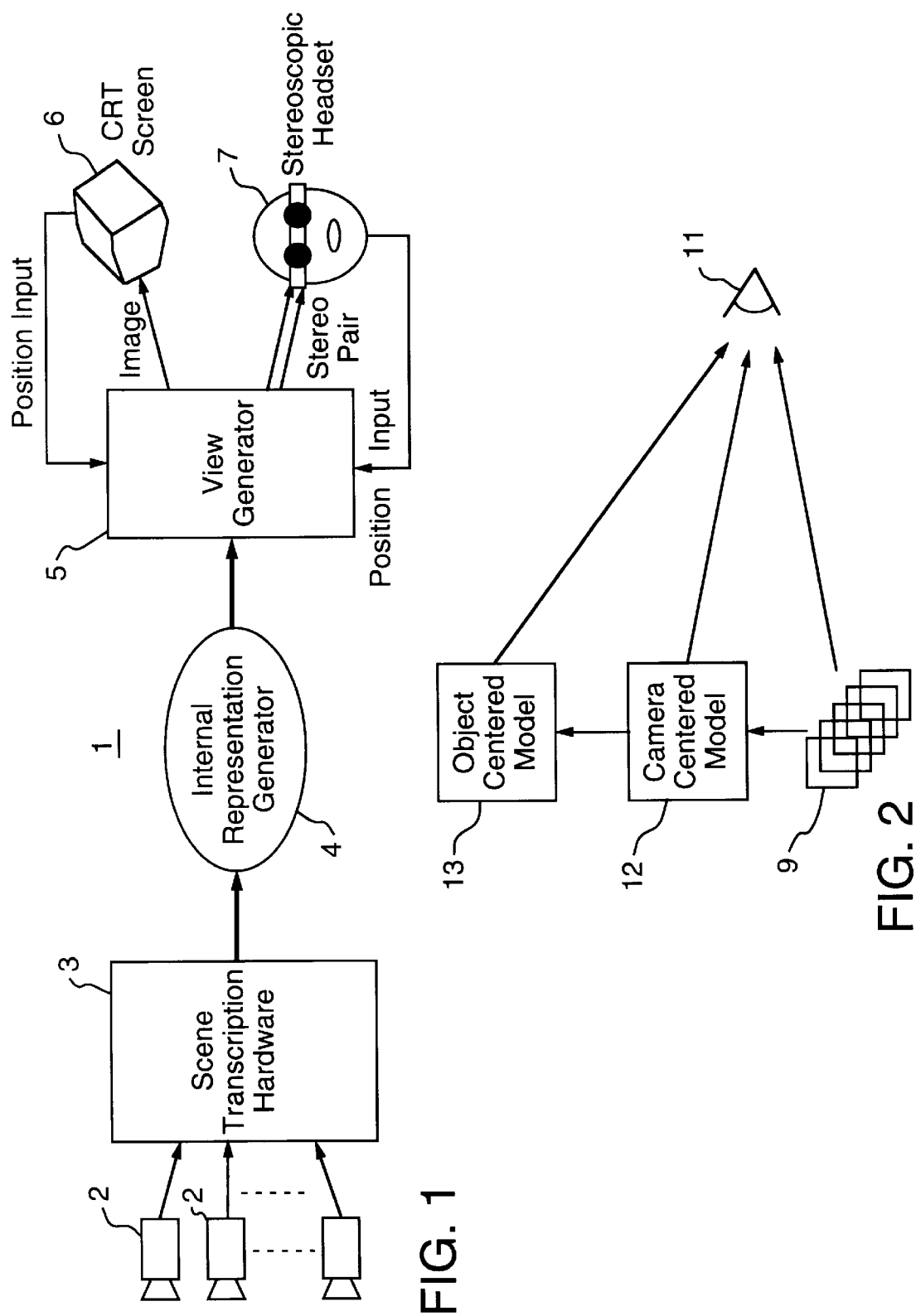

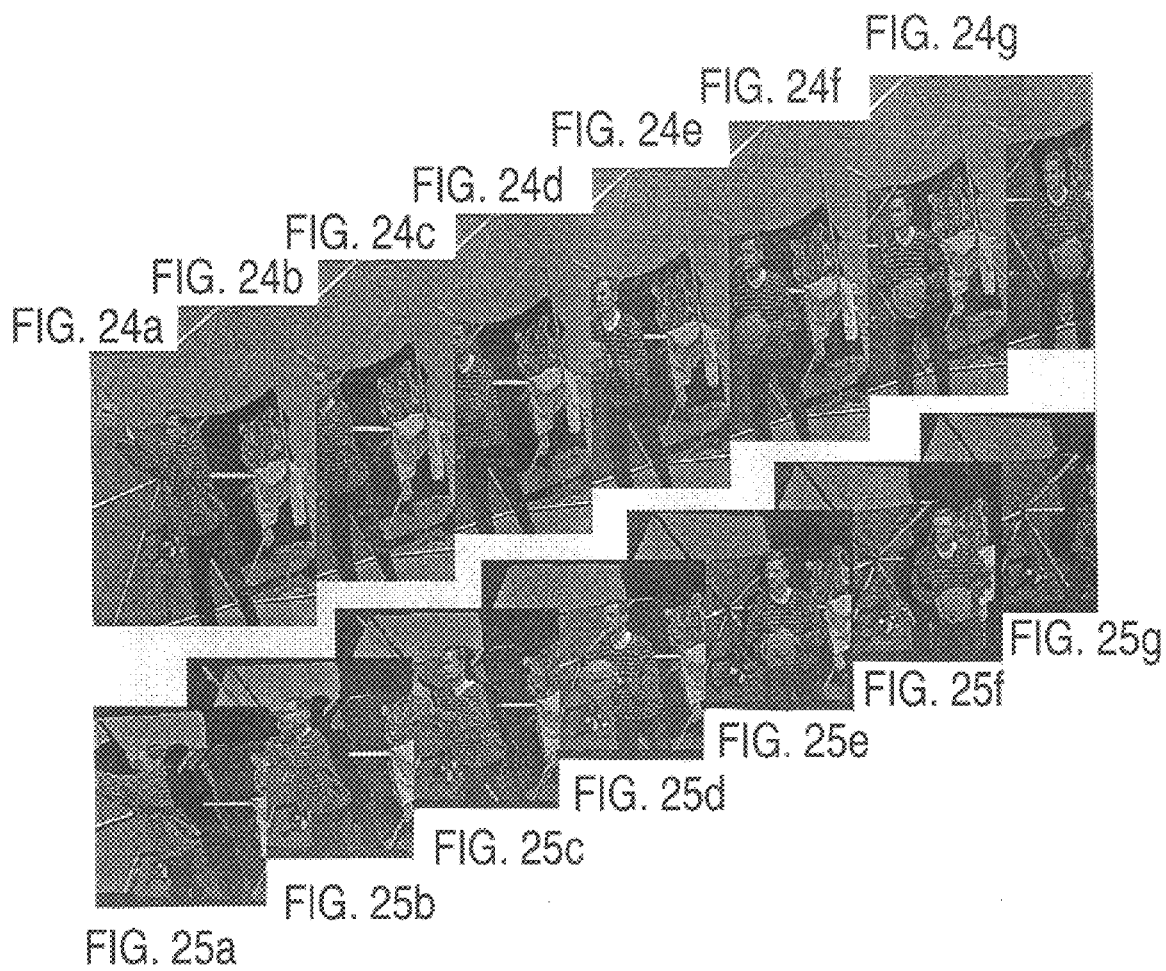

METHOD FOR CREATING VIRTUAL REALITY

This invention was made with support from the United States Government under Grant Number N00014-95-1-0591 awarded by the Department of the Navy. The United States Government has certain rights in the invention.

BACKGROUND OF THE INVENTION

1. Field of the Invention

The present invention is directed to the domain of virtual reality and, more particularly, to processes for creating virtual world models from real world images.

2. Description of the Background

Virtual reality and the concept of virtual worlds has received much attention in the popular press and captured the imagination of the public at large. The ability to navigate through a world seen only on your computer screen, or through a special headset or visor, opens the door for an incredible variety of experiences. Add to the ability to navigate through a virtual environment the capability of picking up objects, or otherwise interacting with objects found in the virtual environment, and the basis for the enthusiasm for the technology becomes readily apparent.

To date, navigable virtual environments with interactive objects embedded therein have been extremely simplistic due to the tremendous amount of modeling that is required to even begin to approximate realistic-looking virtual objects much less a realistic-looking and realistic behaving virtual environment. When one considers size, color, and texture for even a simple object together with how the appearance of the object changes from different vantages, it quickly becomes apparent that the process of creating just virtual objects is a daunting task. As a result, today's virtual environments and objects are either very simplistic looking as they are created using simplistic CAD models, or are extremely expensive, and sometimes both.

One project jointly developed by Apple Computer, Inc., The Massachusetts Institute of Technology, and the University of Regina in Canada called the "Virtual Museum Project" has produced a successful navigable video environment. The virtual museum is a computer-based rendering of a museum which contains various objects of interest. The user can interactively move through the virtual museum and approach individual objects which can be viewed. The objects can be selected and viewed from a variety of perspectives. A complete description of the Virtual Museum Project is found in "The Virtual Museum: Interactive 3D Navigation of a Multi-Media Database," by Miller, et al.

U.S. Pat. No. 5,442,546 entitled Method and Apparatus for Multi-Level Navigable Video Environment issued on Aug. 15, 1995 to Hansen. The Hansen Patent describes a multi-level apparatus to "navigate" an environment consisting of video data. Using a touch-sensitive screen, the user can navigate through the video database of offerings in an interactive manner. Once the viewer has maneuvered to a certain position, a separate data track, for example, data about a particular object, may be viewed.

Although such systems may seem similar to virtual reality systems, they can more accurately be characterized as a video-based hypertext interface to a network of video data. Although it is interactive, it brings up only previously stored scenes in response to user inputs. The systems lack the ability to allow the user to move freely within the environment because of the infinite number of perspectives, i.e. camera angles, that must have been recorded to enable the user to assume such positions. Similarly, images of objects are recorded from predetermined vantages, thereby limiting examination of the objects to just those pre-recorded images.

Apple Computer has developed a software product called Quicktime VR® which allows a user to navigate within a scene. Scenes can be made from photographs, video stills, or computer renderings. To photograph a Quicktime VR® scene, the photographer places a camera on a tripod and shoots a series of pictures, turning the camera thirty degrees after each exposure. The images are digitized and input to the Quicktime VR® software which electronically warps the images, maps the overlapping features, and stitches the images together. Warping makes the stitching possible, and it may appear that images from intermediate viewing positions are generated, but the resultant images are incorrect and contain distortion. In effect, straight lines become curved. When you open a scene with the Quicktime VR® player, the player corrects for the distortion by unwarping the part of the image being displayed. As you move around, the part of the image being displayed changes so as to keep up with your movements. With respect to objects, objects are composed of a large number of images all taken from a slightly different angle. As you turn the object or tilt it up and down virtually, the Quicktime VR® software responds to your movements and displays the appropriate images.

The fundamental limitation of these approaches is that they do not have three-dimensional models of the environment. The patent to Hansen and the Apple Quick Time VR software overcome the problems associated with attempting to model complicated objects and environments by simply storing large numbers of images. However, they both suffer from the limitation that what can be viewed by the user is limited to the images that are pre-recorded. Accordingly, the need exists for a method which combines the ability to quickly capture a tremendous amount of detail in the way which photographs can capture detail, but which allows the user to view the objects from an infinite variety of vantage points the way a mathematically-modeled object or environment can be viewed.

SUMMARY OF THE INVENTION

The present invention is directed to a method of virtualizing reality, i.e., a method of creating virtual reality from images of a real event. The method is comprised of the steps of capturing a plurality of images of each time instant of a real event using a plurality of cameras positioned at a plurality of angles. Each image is stored as intensity and/or color information (hereinafter "image information"). A suitable internal representation is computed from these images and the information regarding the camera angles. An image of each time instant may be generated from any viewing angle using the internal representation of it. The virtual viewpoints could be displayed on a single TV screen or using a stereoscopic display device for a true three-dimensional effect. The event thus virtualized can be navigated through, and interacted with, like any virtual reality system.

One embodiment of the internal representation is in terms of a plurality of camera-centered descriptions, i.e., explicit depth information in association with the intensity information from the camera angle of the scene. These may be obtained using a passive depth recovery method like stereo. The view generation in this embodiment is comprised of a method to select the best camera-centered description for a given viewing angle, plus one or two supporting descriptions to fill the holes generated by moving away from the reference camera's viewpoint.

Another embodiment of the internal representation is in terms of a single object-centered model describing the three dimensional structure of the event. One way to obtain such a model is by merging a plurality of depth information computed from a plurality of camera angles. The view generation strategy in this embodiment comprises a standard rendering tool, similar to those used in virtual reality. Object-centered models, like CAD models, can be modified, interacted with, and transported to novel situations.

The present invention is also directed to an apparatus for creating virtual reality. The apparatus is comprised of a plurality of cameras supported by a frame which enables the cameras to be oriented at any desired angle with respect to the object, event, or environment being virtualized. A first circuit generates a signal for synchronizing the operation of all the cameras. A second circuit generates a time stamp signal having a plurality of values. VCR's or other storage devices are provided for capturing a sequence of images from each of the plurality of cameras, with each of the images being associated with a value of the time stamp signal. An internal representation, of the type described above, is prepared from the captured images. A view generator may be used to reconstruct an object, event, or environment from any viewing angle from the internal representation.

The present invention overcomes two of the primary problems found in the prior art. In the present invention, the virtual world is created from images taken by cameras. Because of that, the virtual world has the fine detail which is found in the real world. However, because the information is stored as some form of internal representation, view generators, such as graphic workstations, can generate a view of the virtualized image from any angle or viewing position. That frees the user to explore the virtualized world from virtually any vantage point, not just the prerecorded vantage points. That permits the fine detail captured by the cameras to be viewed in a way that heretofore only CAD-modeled environments could be viewed. The present invention, therefore, represents a substantial advance over the prior art.

BRIEF DESCRIPTION OF THE DRAWINGS

For the present invention to be clearly understood and readily practiced, the present invention will be described in conjunction with the following Figures wherein:

FIG. 1 is a block diagram illustrating how images recorded by a plurality of cameras may be represented and viewed according to the teachings of the present invention;

FIG. 2 illustrates three different internal representations which can be used in conjunction with FIG. 1;

FIGS. 24a–24g illustrate seven scenes from a basketball sequence from the reference angle; and FIGS. 25a–25g illustrate the same seven scenes as FIGS. 19a–19g, respectively, but from a synthetically-generated moving viewpoint.

DESCRIPTION OF THE PREFERRED EMBODIMENTS

Introduction

Figure 3:
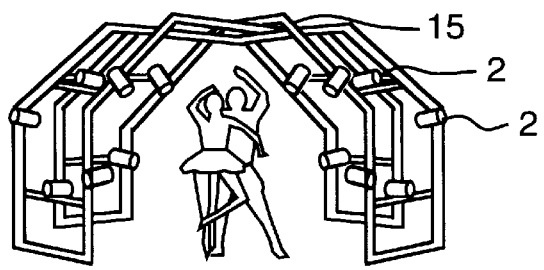
FIG. 3 illustrates a dome and camera arrangement used in conjunction with the method of the present invention.

The present invention is directed to a new visual medium which we refer to as virtualized reality. The visual media available today, e.g., paintings, photographs, moving pictures, television, video recordings, etc. share one common aspect. That common aspect is that the view of the scene is decided by a "director" while recording or transcribing the event, independent of the viewer. In virtualized reality, the selection of the viewing angle is delayed until view time at which time the viewing angle is selected by the user.

To generate data for the virtualized reality medium, images are recorded using cameras positioned to cover the event from all sides. As used herein, images could be of discrete objects, environments, objects interacting with an environment, i.e., an event, etc. Each camera produces a series of images with each image being comprised of a plurality of pixels. The cameras used are passive in the sense that no light grid or other reference need be projected onto the image. A time-varying three-dimensional structure of the image, described in terms of the depth of each point in an image, and aligned with the pixels of the image, is computed for a few of the camera angles, preferably using a stereo method. The camera angles used for that computation are referred to as transcription angles. We refer to the combination of depth and the corresponding pixel information as a scene description. The collection of a number of scene descriptions, each from a different transcription angle, is called the virtualized world. Once a real world object, environment, event, etc. has been virtualized, graphics techniques can render the virtualized model from any viewpoint. The scene description from the transcription angle closest to the viewer's position can be chosen dynamically for display in real-time by tracking the position and orientation of the viewer. The viewer, wearing a stereo viewing system, can freely move about in the virtualized world and observe it from a viewpoint chosen dynamically at view time. The depth information can be further manipulated to produce object centered descriptions of everything within an image. Once such object centered descriptions are produced, the objects are essentially reduced to CAD models, views of which can then be generated from any viewing angle.

A system 1 constructed according to the teachings of the present invention is illustrated in FIG. 1. The system 1 is comprised of a plurality of cameras 2 generating image information. Capturing the images is represented in FIG. 1 by a box 3 labeled scene transcription hardware. The information captured by the scene transcription hardware 3 is used by an internal representation generator 4 to create an internal representation. The internal representation generator 4 may be an appropriately programmed computer with the scene transcription data being supplied thereto. The type of scene transcription performed may be related to the intended internal representation. The internal representation is then used by a view generator 5 which produces an image, that may be viewed on an interactive screen 6, or a stereo pair, that may be viewed on a stereoscopic headset 7. The viewer provides position and other information, e.g., for picking up an object, through the interactive screen 6 or other type of input/interface device. The view generator 5 generates the view or stereo pair in response to the position input received from the user. The operation of the system illustrated in FIG. 1 is now further explained in conjunction with FIG. 2.

In FIG. 2, three different internal representations are illustrated. A plurality of images 9 are produced by the cameras 2. In the simplest internal representation represented by arrow 10, a user 11 simply views one of the plurality of images 9 which corresponds most closely to the user's virtual location. In effect, arrow 10 represents the prior art in that the user 11 only sees prerecorded images.

The method and apparatus of the present invention go beyond the prior art because of a unique scene transcription method and apparatus and because of the internal representations which may be produced. As shown in FIG. 2, an internal representation in the form of depth information is extracted from the plurality of images 9 which may be used to generate camera-centered models 12. The camera centered models, i.e., the depth information, can be used to produce a view of an image which can be provided to the user 11 even when none of the plurality of images 9 represents the view seen from the virtual position of the viewer 11.

The method of the present invention may be carried a step further in which the internal representation 4 is implemented by creating object centered models 13 from the depth information. When object centered models are created, in effect CAD models of the objects are created. Thus, a view of the object from any viewing angle can be generated using standard CAD techniques. Both internal representations 12 and 13 enable the viewer 11 to move through the virtualized environment in a manner heretofore available only in systems which have been laboriously created using CAD models. Thus, the fine detail captured by cameras can be used to rapidly create a virtual world.

Scene Transcription

FIG. 3 illustrates a dome 15 which can be used to virtualize an event. Cameras 2 are placed all around the dome 15 providing views from angles surrounding the event. A prototype dome 15 has been built which is hemispherical in shape, five meters in diameter, and constructed from nodes of two types and rods of two lengths. In the prototype dome, fifty-one cameras have been provided. Fifty-one different depth maps for each scene are extracted using a clustering of neighboring cameras for each camera. The cameras are mounted on special L-shaped aluminum brackets which can be clamped onto the rods of the hemispherical dome anywhere on the rods of the dome.

To synchronously acquire a set of video streams, a single control signal can be supplied to the cameras to simultaneously acquire images and to the digitizing equipment to simultaneously capture the images. To implement that approach directly in digital recording hardware, the system would need to handle the real-time video streams from many cameras. For a single monochrome camera providing thirty images per second, 512×512 pixels per image with eight bits per pixel, the system would need to handle 7.5 Mbytes of image data per second. A sustained bandwidth to store the captured data onto a secondary storage device is beyond the capabilities of typical image capture and digital storage systems, even with the best loss-less compression technology available today. For example, our current system—a Sun Sparc 20 workstation with a $K^2T$ model V300 digitizer—can capture and store only about 750 Kbytes per second. Specialized hardware could improve the throughput but at a substantially higher cost. Replicating such a setup to capture many video channels simultaneously is prohibitively expensive.

Figure 4:
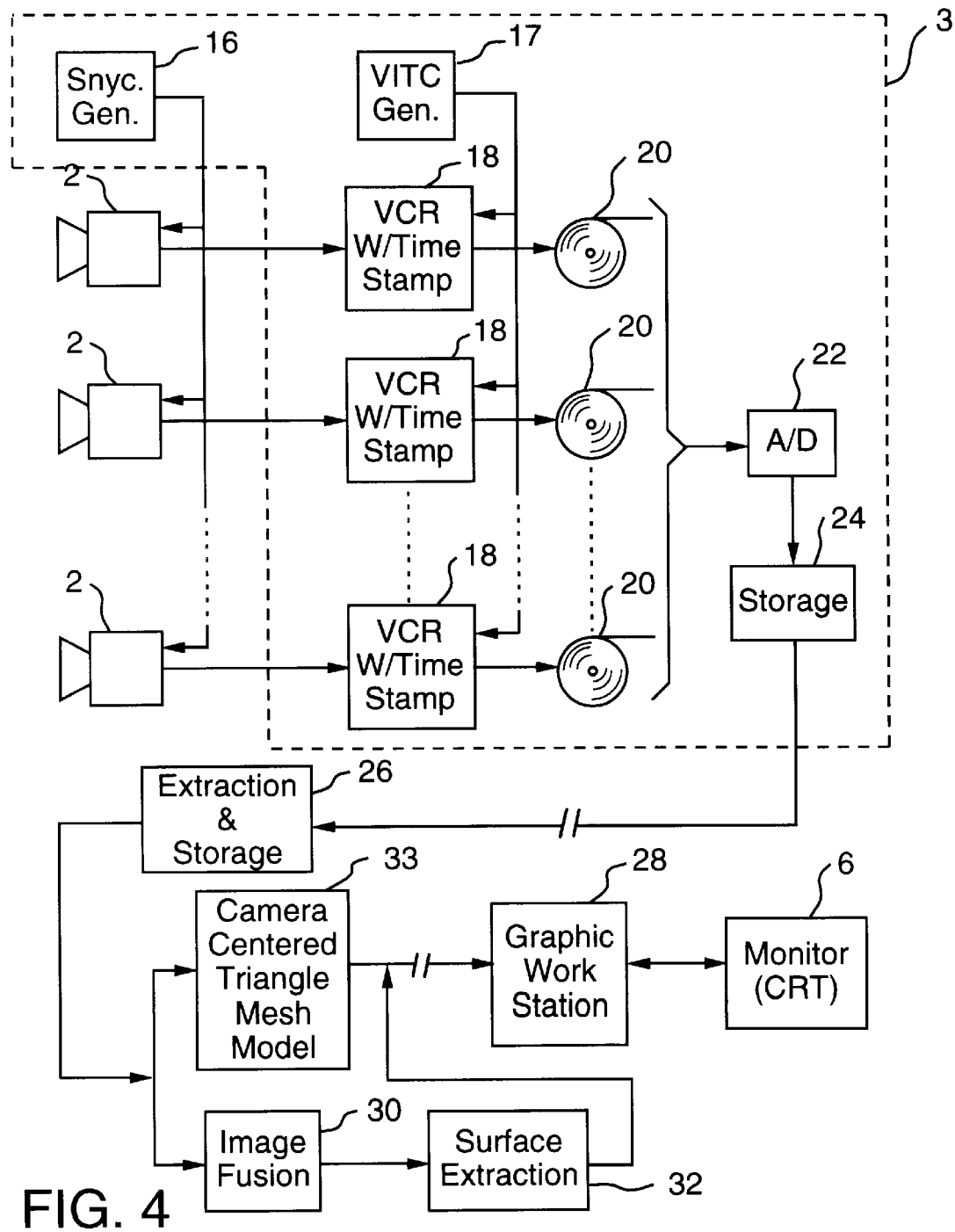
FIG. 4 is a block diagram of the present invention.
Figure 5A:
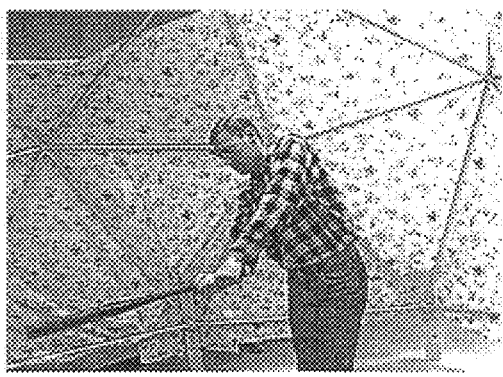
FIGS. 5a–5e illustrate five images captured by five different cameras which can be used to compute one scene description.
Figure 5B:
Figure 5C:
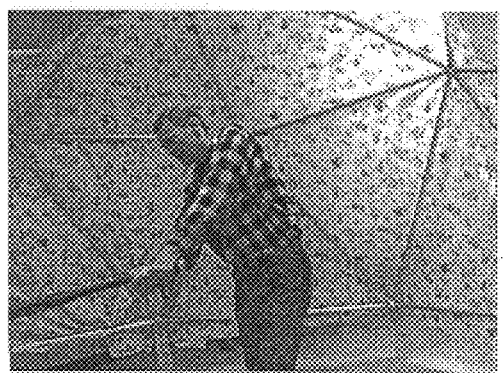
Figure 5D:
Figure 5E:

We developed an off-line system illustrated in FIG. 4 to synchronously record frames from multiple cameras 2. The cameras 2 are first synchronized to a common sync signal produced by a sync signal generator 16. The output of each camera 2 is time-stamped with a common Vertical Interval Time Code (VITC) produced by a time code generator 17 and recorded on tape using one VCR 18 for each camera 2. The resulting tapes 20 thus have each frame time stamped. The tapes 20 are digitized individually off-line in A/D device 22 which comprises a frame grabber, analog to digital converter, and software that interprets the VITC time code embedded in each frame. We can capture all frames of a tape 20 by playing the tape as many times as the speed of the A/D device 22 necessitates. The time code also allows us to correlate the frames across cameras, which is crucial when transcribing moving events. Interested readers can refer to a separate report by Narayanan et al. entitled "Synchronizing and Capturing Every Frame from Multiple Cameras", Robotics Technical Report, CMU-RI-TR-95-25, Carnegie Mellon University 1995, which is hereby incorporated by reference, for more details on the synchronous multi-camera recording and digitizing setup. The digitized information is then stored in any suitable storage media 24. The components enclosed within the dotted box generally correspond to the box labelled scene transcription hardware 3 in FIG. 1.

Structure Extraction

FIGS. 5a–5e illustrate a frame as seen by five different cameras. An extraction technique, box 26 in FIG. 4, is performed on the stored image information. In the presently preferred embodiment, a stereo algorithm, which computes estimates of scene depth from correspondence among images of the scene, is used to extract depth information from the images of FIGS. 5a–5e. In FIG. 4, the line connecting storage device 24 with extraction technique box 26 is shown with a break to indicate that the extraction technique, which is implemented in software in the preferred embodiment, may be performed on a machine physically distinct from the storage device 24.

Figure 6:
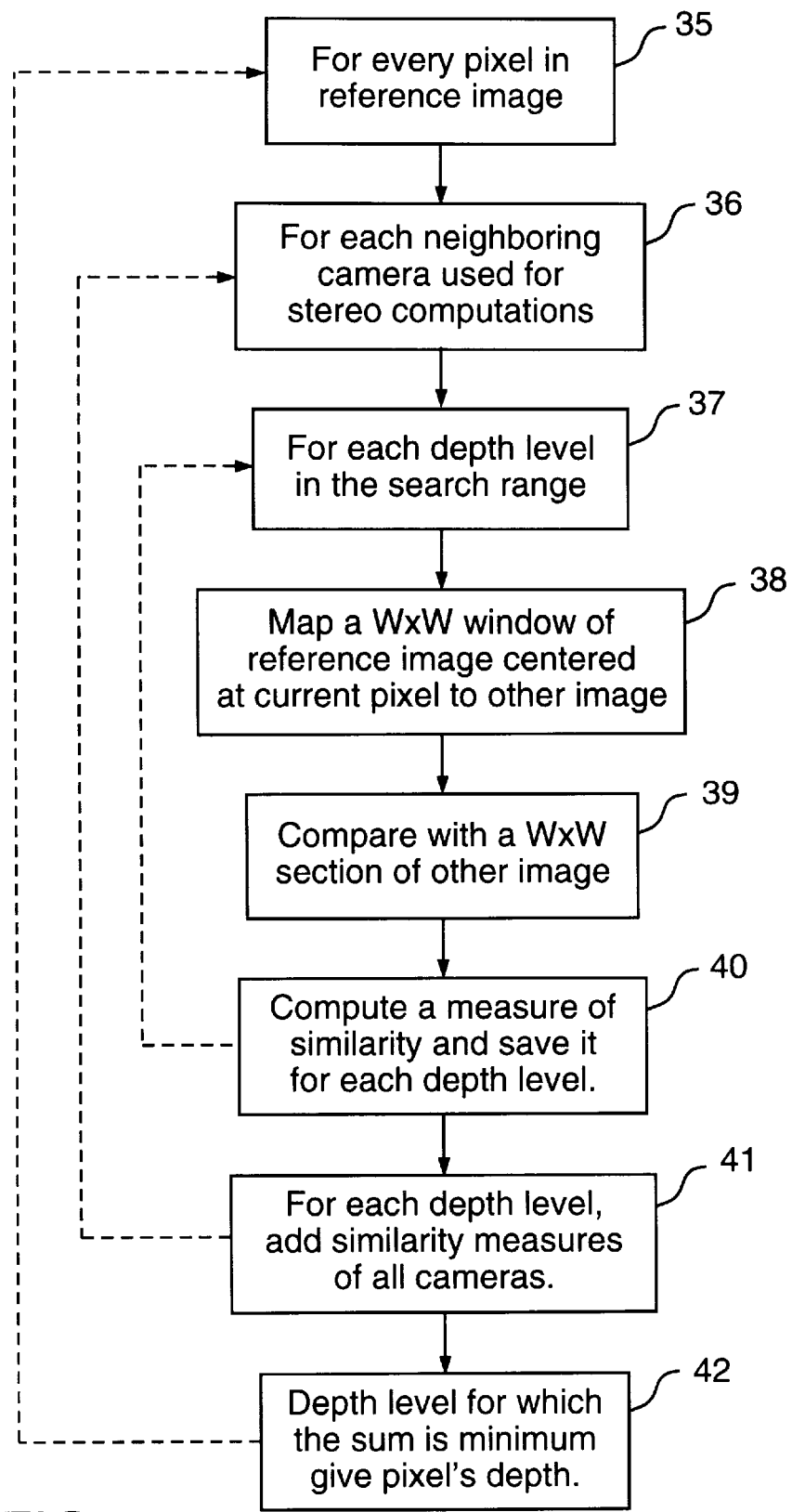
FIG. 6 is a block diagram of a structure extraction process using an MBS technique.

In the preferred embodiment of the present invention, steps 35 through 42 of a multi-baseline stereo (MBS) technique, shown in FIG. 6, are used to extract a three-dimensional structure from the multi-camera images of FIGS. 5a–5e. The MBS extraction technique is well known in the art, see Okutomi and Kanada, "A multiple-baseline stereo", *IEEE Transactions on Pattern Analysis and Machine Intelligence,* 15(4):353–363 (1993), which is hereby incorporated by reference, such that it need not be described herein.

The present invention is not intended to be limited to the use of the MBS technique or even limited to a stereo technique. The choice of the MBS technique was motivated primarily by two factors. First, the MBS technique recovers dense depth maps, i.e., a depth estimate corresponding to every pixel in the intensity images, which is useful for image reconstruction. Second, the MBS technique takes advantage of the large number of cameras which we are using for scene transcription to thereby increase precision and reduce errors in depth estimation.

In our embodiment of the MBS technique, rather than send the MBS-computed depth maps directly on to the next processing stage, we manually edit the depth map to correct for errors that occur during automatic processing. While a good window size helps by reducing the number of errors to be corrected, it is less important in our approach because the user has the opportunity to correct the errors in the depth maps. Such manual editing, however, is not necessary. Rather, it is implemented in our embodiment to improve quality.

Before the MBS technique can be performed, the cameras must be calibrated. We perform both intrinsic and extrinsic camera calibration to obtain epipolar line constraints using an approach from Tsai. See R. Tsai, "A versatile camera calibration technique for high-accuracy 3D machine vision metrology using off-the-shelf TV cameras and lenses", *IEEE Journal of Robotics and Automation,* 3(4):323–344, 1987, which is hereby incorporated by reference. That approach accounts for camera pose in a world coordinate system (3D rotation and translation) scaling (focal length and aspect ratio), shifting of the image (image center), and length distortion (a single coefficient for radial length distortion). Rather than calibrate all parameters of each camera at the same time, we separate the process into two steps, one for intrinsic parameters (focal length, aspect ratio, image center, and lens distortion), and the second for extrinsic parameters (rotation and translation). In the first step, we have each camera image a calibration object with known locations of points in a 3D volume. We then extract the image projections of those 3D points. The calibration process adapts the camera model so that the 3D points project to the corresponding image points. When that process is complete, we position the cameras in the recording environment and perform the final calibration step, determining the camera pose relative to a coordinate system common to all the cameras. We calibrate using a portion of the lab floor visible to all cameras, having laid out marks on the floor with known separation to provide 3D calibration points as before. Using the recovered calibration, any point in the three dimensional coordinate system of the reference camera can be mapped to a point in the three dimensional coordinate system of any of the other cameras.

To find correspondences, we again match a reference region to another image as a function of inverse depth ç. To find the position in the second image corresponding to the inverse depth, we convert the reference point and inverse depth into a three dimensional coordinate, apply the camera-to-camera mapping, and project the converted three dimensional point into the other image. As with the parallel-camera configuration, the full search is conducted by matching each reference image point to the other images for each possible ç. We then add the match error curves from a set of image pairs and search for the minimum of the combined error function.

Figure 7:
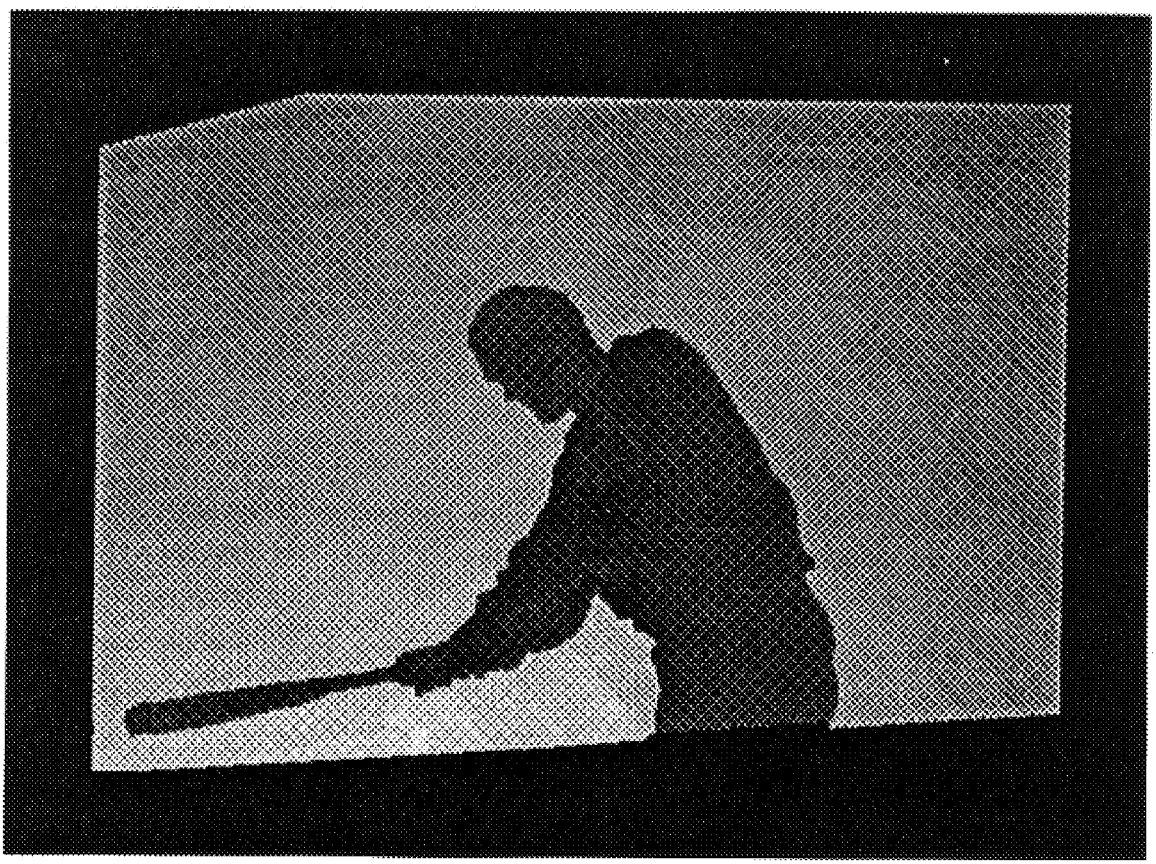
FIG. 7 illustrates a depth map constructed from the images of FIGS. 5a–5e.

FIG. 7 illustrates the depth map recovered by applying that approach to the input images shown in FIGS. 5a–5e. The depth map has seventy-four levels for a depth range of two meters to five meters. The depth map is stored in a manner such that it is stored in association with the image information, e.g., intensity map, for the image from which the depth information was extracted. The process could be carried out five times, sequentially using each of the five images of FIGS. 5a–5e as the reference image to obtain five slightly different depth maps, with each depth map being stored in association with the intensity map for the reference image for that iteration.

Stereo techniques used to extract the scene structure require images corresponding to precisely the same time instant from every camera to be fed to them to accurately recover three-dimensional scene structure. The need to virtualize every frame in video streams containing fast moving events potentially exists to satisfactorily reproduce the motion. Therefore, the facility discussed hereinabove under the heading Scene Transcription which is set up to acquire scene descriptions should cover the action from all angles and should have the capability to record and digitize every frame of each video stream synchronously.

Recovery of Dynamic Scene Structures

A scene description consists of a depth map providing a dense three dimensional structure of the scene aligned with the image information, e.g., intensity map, of the scene. A point (i, j) in the depth map gives the distance of the intensity image pixel (i, j) from the camera. One type of internal representation that can be created from the scene descriptions is an object-centered model which is created from the steps of image fusion 30 and surface extraction 32 as shown in FIG. 4. The purpose of the step of image fusion 30 is to integrate all the scene descriptions into one object-centered 3D model of the scene, a problem for which numerous algorithms have been proposed. With errors in the depth maps, however, the fusion algorithm must be robust, even when the errors are systematic (as is the case with stereo) rather than random. Based on its resilience to noise, simplicity of design, and non-iterative operation, we use a technique that is somewhat similar to several known techniques, e.g., A. Hilton, "On Reliable Surface Reconstruction From Multiple Range Images," *Technical Report VSSP-TR-5/95,* University of Surry (October 1995), and H. Hoppe et al., "Piecewise Smooth Surface Reconstruction," *Computer Graphics SIGGRAPH '94,* 295–302 (1994), which are hereby incorporated by reference. A weight may also be attached to each range estimate, allowing easy incorporation of range estimate reliability into the fusion process.

Figure 8:
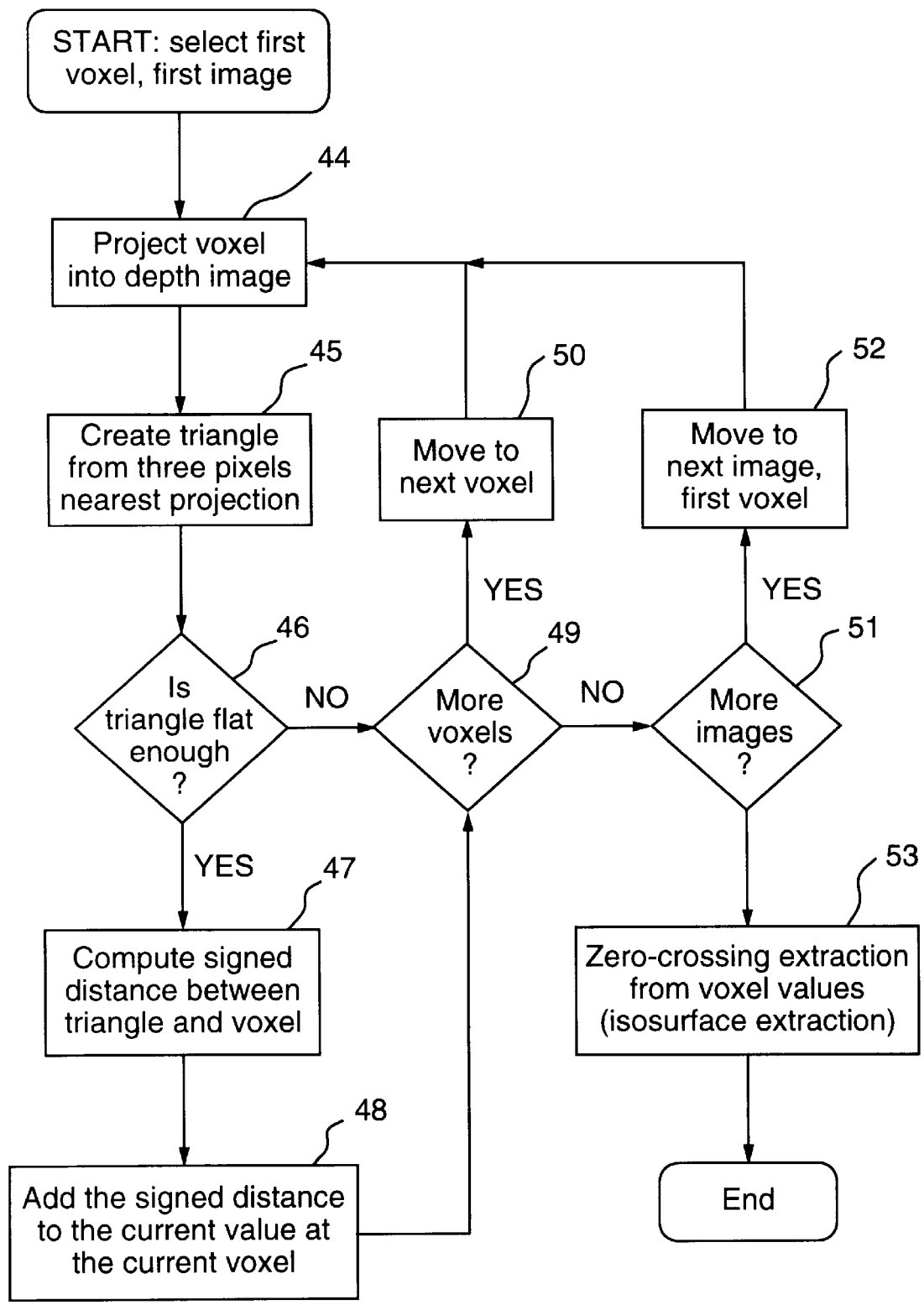
FIG. 8 is a block diagram of an isosurface extraction process.
Figure 9:
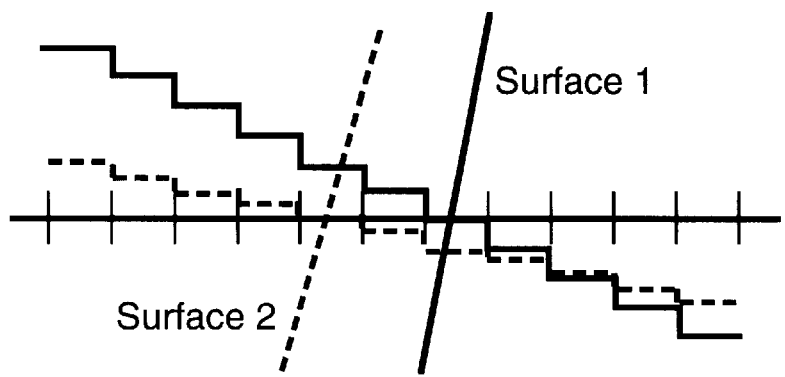
FIG. 9 illustrates how two surface estimates contribute to a row of voxels.
Figure 10:
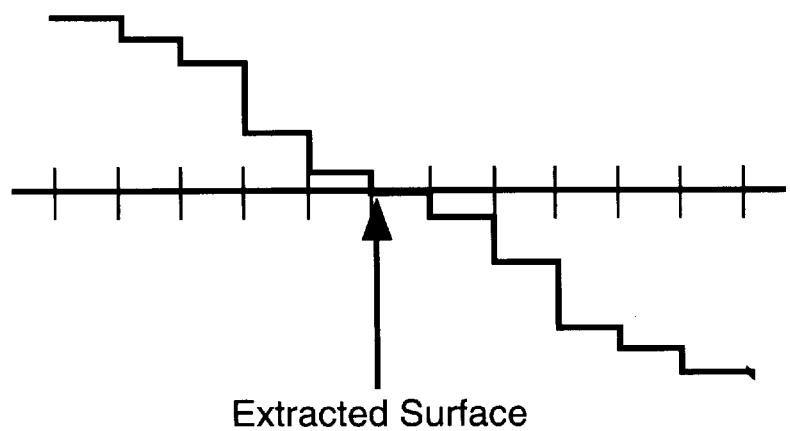
FIG. 10 illustrates the extraction of the final surface at the zero crossings of the values accumulated in the voxels.

The surface extraction step 32 is shown in greater detail in FIG. 8. At step 44, each voxel in an object-centered 3D space is projected onto a tessellated surface which results from the fusion process. A triangle is created at step 45 from the three pixels nearest to the projection. If the triangle is sufficiently flat as determined by decision step 46, the weighted, signed distance between the triangle and the voxel is computed at step 47 and accumulated at step 48. The accumulation process is shown in FIG. 9. After accumulating across all voxels and images as shown by steps 49, 50,

51, 52, the voxels implicitly represent the surface by the zero crossings of their values. By finding the zero crossings, which is performed at step 53, the surface is extracted as shown in FIG. 10.

This process, implicit surface (or isosurface) extraction, is well studied and has standard solutions such as the marching cubes algorithm, W. Lorensen and H. Cline, "Marching Cubes: a High Resolution 3D surface Construction Algorithm, " *Computer Graphics SIGGRAPH '87*, 163–170 (July 1987); J. Bloomenthan, "An Implicit Surface Polygonizer," *Graphics Gems IV*, ed. P. Heckbert, 324–349 (1994) (ftp://ftpgraphics.standard.edu/pub/Graphics/GraphicsGems/GemIV/GGemsIV.tar.Z), both of which are hereby incorporated by reference. Such algorithms generate a 3D triangle mesh representations of the implicit surfaces.

Figure 11:
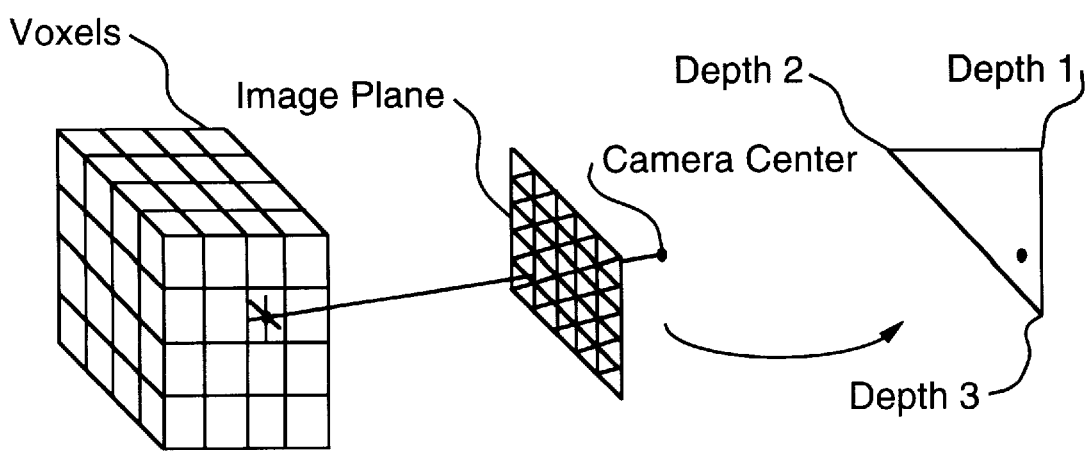
FIG. 11 illustrates projecting each voxel into the image plane; the range image is interpolated to compute the distance from the camera to the surface, from which the signed distance from the voxel to the surface is computed.
Figure 12A:
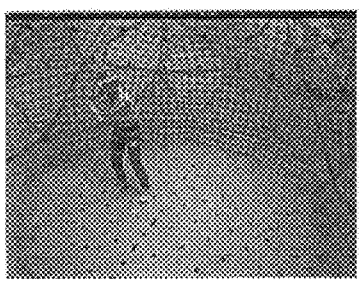
FIGS. 12a–12k illustrate eleven frames of a person swinging a bat.
Figure 12B:
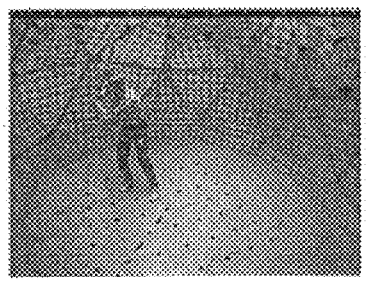
Figure 12C:
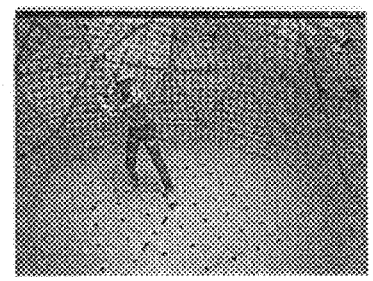
Figure 12D:
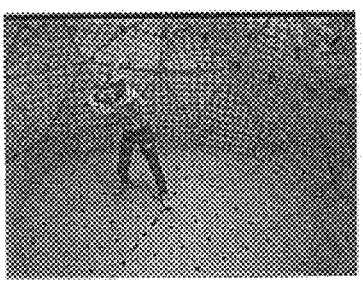
Figure 12E:
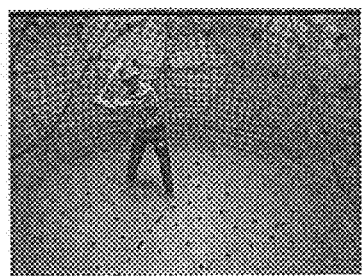
Figure 12F:
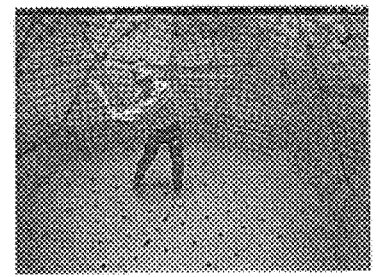
Figure 12G:
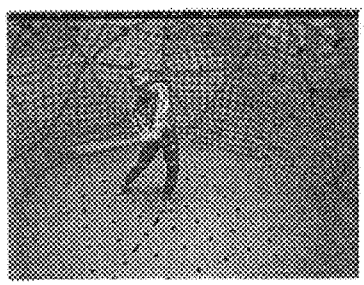
Figure 12H:
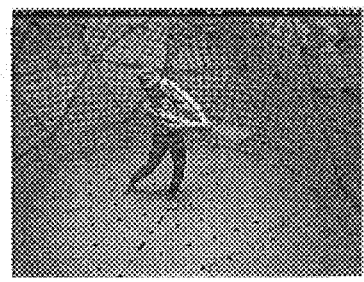
Figure 12I:
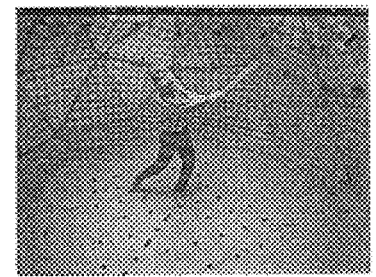
Figure 12J:
Figure 12K:
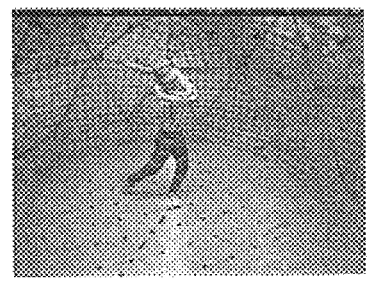

In approach, we allow the algorithm to adjust all voxels in front of the surface as viewed from the sensor generating the surface. For voxels far in front of the surface, we clip the weighted, signed distance contribution of each viewpoint to a maximum so that this single view does not overwhelm all others in the fusion process. That modification gives significant improvement in the ability of the algorithm to reject the numerous outliers in our images, while not significantly degrading the recovered shape. In summary, we forward map (i.e., project) each voxel into the image using the known camera models and interpolate depth in the images, as shown in FIG. 11.

We tested our system on an 11-frame image sequence captured by 51 cameras mounted on a geodesic dome five meters in diameter. The scene contained one person swinging a baseball bat, as shown in the sequence of images in FIGS. 12*a*–12*k*. The 11 frames represent a sampling rate of six images per second, sufficient to capture the dominant motion in the scene. All 30 images per second could have been captured using our system, but we limited the initial tests to the slower sampling for practical considerations. Note that the sampling interval was not $\frac{1}{6}$ second but rather $\frac{1}{60}$th second, corresponding to one field of an NTSC video frame. Sampling for $\frac{1}{6}$ second would have caused tremendous motion blur, making the images relatively useless. Each camera underwent a two-stage calibration process, as discussed above. Each camera had fixed gain and their shutters set to open for the full sampling interval (one field time, or $\frac{1}{60}$ second). The lenses were set to manual focus and iris control, and adjusted to bring the scene into reasonable focus and intensity. The images from each camera have approximately 90 degrees horizontal by 70 degrees vertical field of view.

Figure 13A:
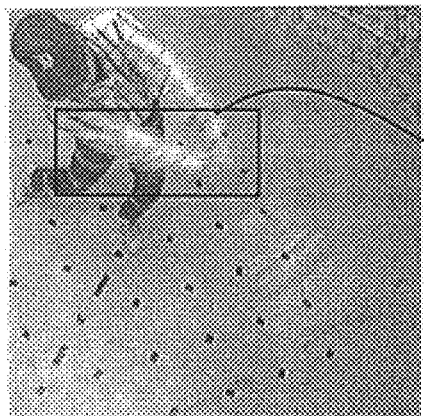
FIGS. 13a and 13b illustrate the motion between image fields.
Figure 13B:
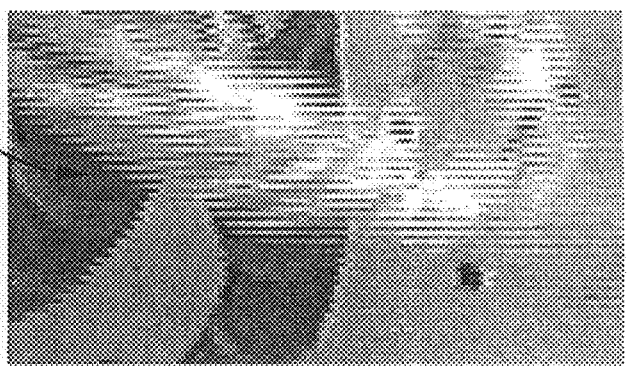

To capture the images, we used the synchronized multi-camera recording system discussed earlier, which captures NTSC video onto S-VHS VCRs. For this test, we determined that we only needed images at approximately 6 Hz, so we digitized the necessary frames, at 490 rows by 640 columns resolution, using the approach of repeatedly playing the videotape until the necessary frames were captured for each camera. Because NTSC video is interlaced, the even and odd rows of each NTSC frame are sampled one NTSC field time apart ($\frac{1}{60}$ second). The change in dynamic scenes during that time (as shown in FIGS. 13*a* and 13*b*) may be significant for stereo processing, so we separated each video frame into the two fields, each with resolution 245×640, and discarded the second field. We then smoothed and subsampled the first field by a factor of two horizontally, resulting in images of resolution 245×320. These are the images shown in FIGS. 12*a*–12*k*.

Figure 14A:
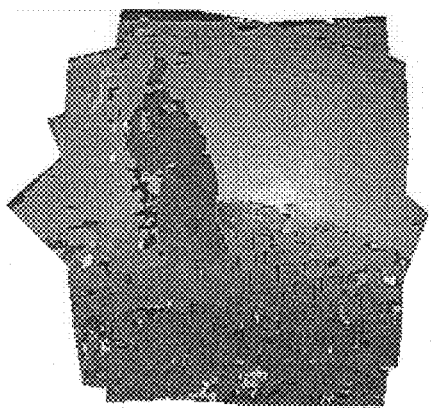
FIGS. 14a and 14b illustrate a typical range image and the corresponding intensity image, respectively.
Figure 14B:
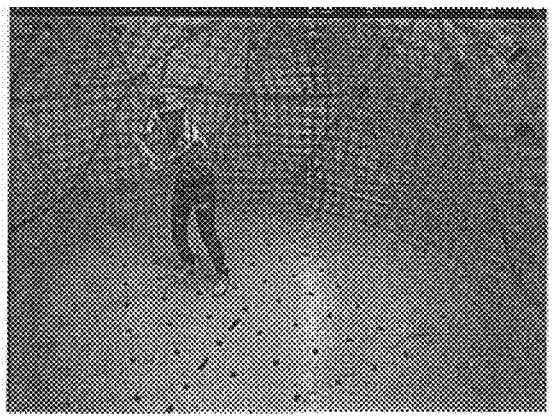
Figure 15A:
FIGS. 15a–15l illustrate the sequence of extracted meshes from the eleven frame sequence of FIGS. 12a–12k.
Figure 15B:
Figure 15C:
Figure 15D:
Figure 15E:
Figure 15F:
Figure 15G:
Figure 15H:
Figure 15I:
Figure 15J:
Figure 15K:
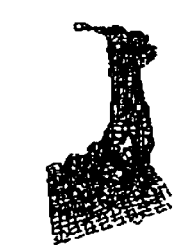
Figure 15L:
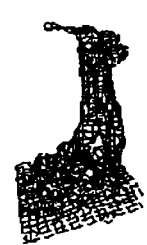

With all of the images collected, we next computed range images using the MBS technique. We grouped each camera with all of its immediate neighbors to create clusters of cameras wherein each cluster contained four to seven cameras. For each image in each sequence, we used these clusters to compute range images at 245×320 resolution, with depth resolution ranging from 155–264 levels, depending on the actual geometric configuration of each cluster. The depth search range began at 750 mm and ended at 5000 mm from each reference camera, measured along its optical axis. A typical range image and the corresponding intensity image are shown in FIGS. 14*a* and 14*b*, respectively.

With stereo processing complete, we passed the computed range images directly to the fusion process. Although the process can easily combine reliability estimates into the fusion process, we eliminated all weights for simplicity, thus treating all samples equally. The fusion process was run over the same 3D volume (a space of 6000 mm×6000 mm×6000 mm, which includes all of the sensor positions in addition to the scene) for each time frame. The process used 300×300×300 voxels to represent the space, corresponding to a voxel size of 20 mm×20 mm×20 mm.

Note that the voxels in our approach are treated independently, allowing us to process individual voxels or groups of voxels separately. This freedom allows us to group the voxels and the range images for effective use of available memory and of parallel hardware. By allocating only a few planes of voxels at a time, for example, we can greatly reduce memory usage during fusion. By distributing voxel planes over a number of processors—or completely independent computers—we easily achieve substantial parallel speedups. In this initial set of experiments, we decomposed several large voxel spaces into sets of planes and process the sets on independent computers. That strategy provides nearly linear speedups with the number of computers used.

With the fusion process complete, we next applied the aforementioned Bloomenthal implementation of the Marching Cubes algorithm to extract the isosurface representing the scene structure. We then decimated the mesh using a simple mesh decimation program. The sequence of meshes is shown in FIGS. 15*a*–15*l*, where we have removed the background so that the person is more clearly visible. The player is clearly extracted from each time instant, although the bat is recovered poorly because the voxel size (2 cm on a side) is nearly as large as the bat. This behavior highlights the need for voxels to be much smaller than the smallest feature to be extracted from the scene.

Figure 16:
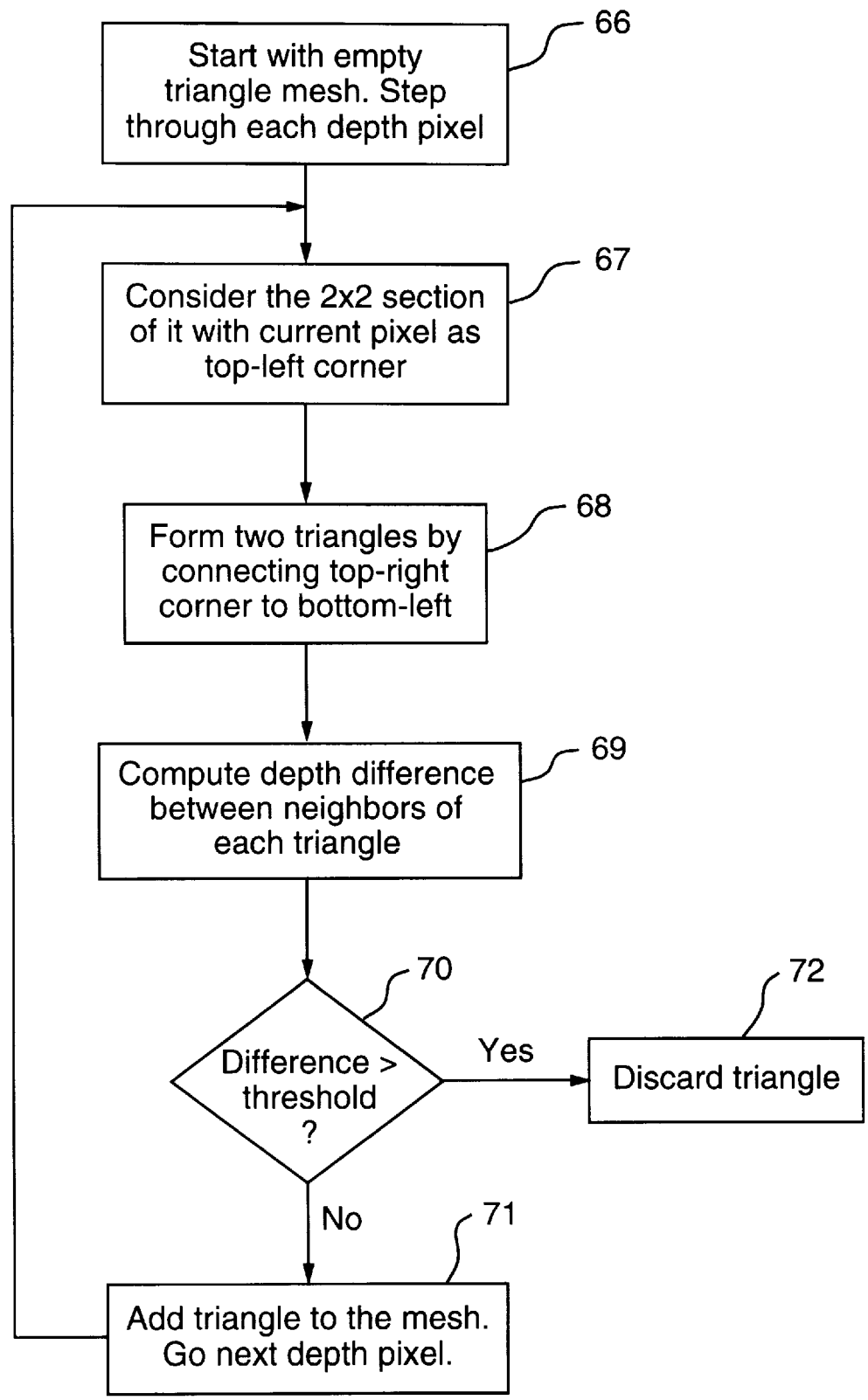
FIG. 16 is a block diagram of a process for computing a camera centered model from a depth map.

Returning to FIG. 4, another type of internal representation is in terms of a plurality of camera-centered models 33, each computed from a scene description. FIG. 16 demonstrates how to convert the depth map into a camera centered model. Starting at step 66, we generate a triangle mesh at steps 67, 68 by converting every 2×2 section of the depth map into two triangles. Table I illustrates how the mesh is defined. The (x, y, z) coordinates of each point in the image are computed from the image coordinates and the depth using the intrinsic parameters of the imaging system. Each vertex of the triangle also has a texture coordinate from the corresponding intensity image. That method results in 2×(m−1)×(n−1) triangles for a depth map of size m×n. The number of triangles for the depth map shown in FIG. 7 is approximately 200,000. Though this is a large number of triangles, the regularity makes it possible to render them efficiently on graphics workstations.

TABLE I

Triangle Mesh and
Texture Coordinate Definition

| (x1, y1, z1) | (x2, y2, z2) |
| (u1, v1) | (u2, v2) |
|  |  |
| (u3, v3) | (u4, v4) |
| (x3, y3, z3) | (x4, y4, z4) |

Triangle 1:

Vertex 1: (x1, y1, z1) texture coord: ($u_1/m$, $v_1/n$)
Vertex 2: (x2, y2, z2) texture coord: ($u_2/m$, $v_2/n$)
Vertex 3: (x3, y3, z3) texture coord: ($u_3/m$, $v_3/n$)

Triangle 2:

Vertex 1: (x2, y2, z2) texture coord: ($u_2/m$, $v_2/n$)
Vertex 2: (x3, y3, z3) texture coord: ($u_3/m$, $v_3/n$)
Vertex 3: (x4, y4, z4) texture coord: ($u_4/m$, $v_4/n$)

After the triangles have been formed, the depth difference between neighbors of each triangle is computed at step 69. If the difference is greater that a predetermined threshold as determined by decision step 70, the triangle is discarded at step 72. If the difference is less than the predetermined threshold, the triangle is added to the mesh and the process proceeds to the next depth pixel as shown by step 71.

The number of triangles in a scene description can be reduced by adopting an algorithm developed by Garland and Heckbert that simplifies a general dense elevation/depth map into planar patches. See M. Garland and P. S. Heckbert "Fast Polygonal Approximation of Terrains and Height field", *Computer Science Tech Report*, CMU-CS-95-181, Carnegie Mellon University, (1995), which is hereby incorporated by reference. The algorithm computes a triangulation using the smallest number of vertices given a measure for the maximum deviation from the original depth map. The procedure starts with two triangles defined by the outer four vertices. It repeatedly grows the triangle mesh by adding the vertex of maximum deviation and the corresponding triangle edges until the maximum deviation condition is reached. Using that technique, we have reduced mesh size by factors of 20 to 25 on typical scenes without effecting the visual quality of the output.

Figure 17:
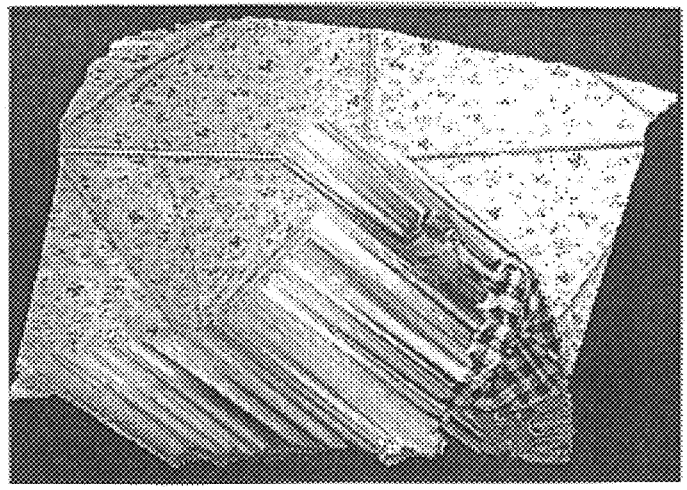
FIG. 17 illustrates a reconstructed scene without discontinuity compensation.
Figure 18:
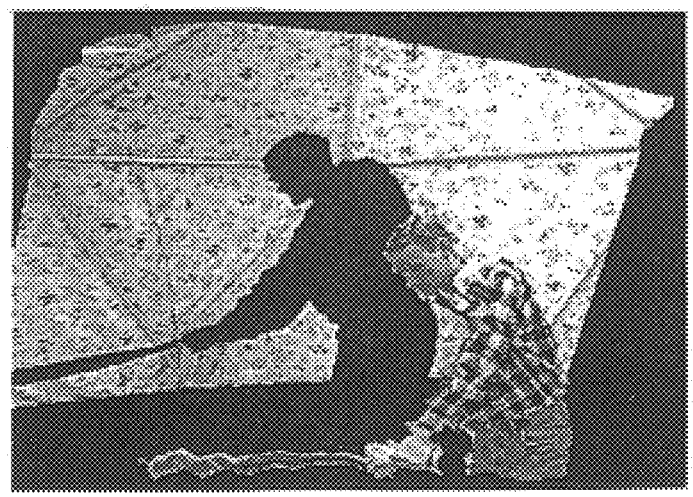
FIG. 18 illustrates the reconstructed scene of FIG. 17 with the discontinuity omitted, i.e. a hole.

The rendering using the mesh described in Table I creates artificial surfaces at depth discontinuities. The decision step 70 of FIG. 16 is intended to correct that. If the triangle is discarded in the "yes" path, there will be no artificial surfaces, but there will be holes. In FIG. 17, for instance, the person and the wall appear to be connected. We, therefore, delete those artificial surfaces by not rendering the triangles that overlap discontinuities, resulting in "holes" as seen in FIG. 18. Fixing such holes is discussed in the view generation process next discussed.

View Generation

The present invention is capable of synthesizing an event, object, or environment from arbitrary viewing angles using the internal representations previously discussed. To render an object, event, or environment from viewing angles other than those where cameras are actually located from scene descriptions, a graphic workstation 28 (FIG. 4) may be provided to perform the function of the view generator 5 of FIG. 1. The graphic workstation 28 is preferably used in conjunction with the interactive monitor 6. The graphic workstation 28 may be physically part of the same machine storing the internal representation, or it may simply be in communication with the device storing the representation through a modem, broadcast channel, or any other suitable means of communication.

In general, the scene description is translated into an object type, such as a polygonal mesh. The image information, i.e., intensity and/or color information, is texture mapped onto the polygonal mesh thereby generating visually realistic images of the scene. Graphic workstations have been chosen because of their specialized hardware to render images quickly. For example, a Silicon Graphics Onyx/RE2 can render close to one million texture mapped triangles per second.

The following description explains in detail how views are generated from a plurality of camera centered models. The reader should understand that the following description is one technique for creating realistic renderings from the stored information and that the present invention is not limited to the disclosed embodiment.

Figure 19:
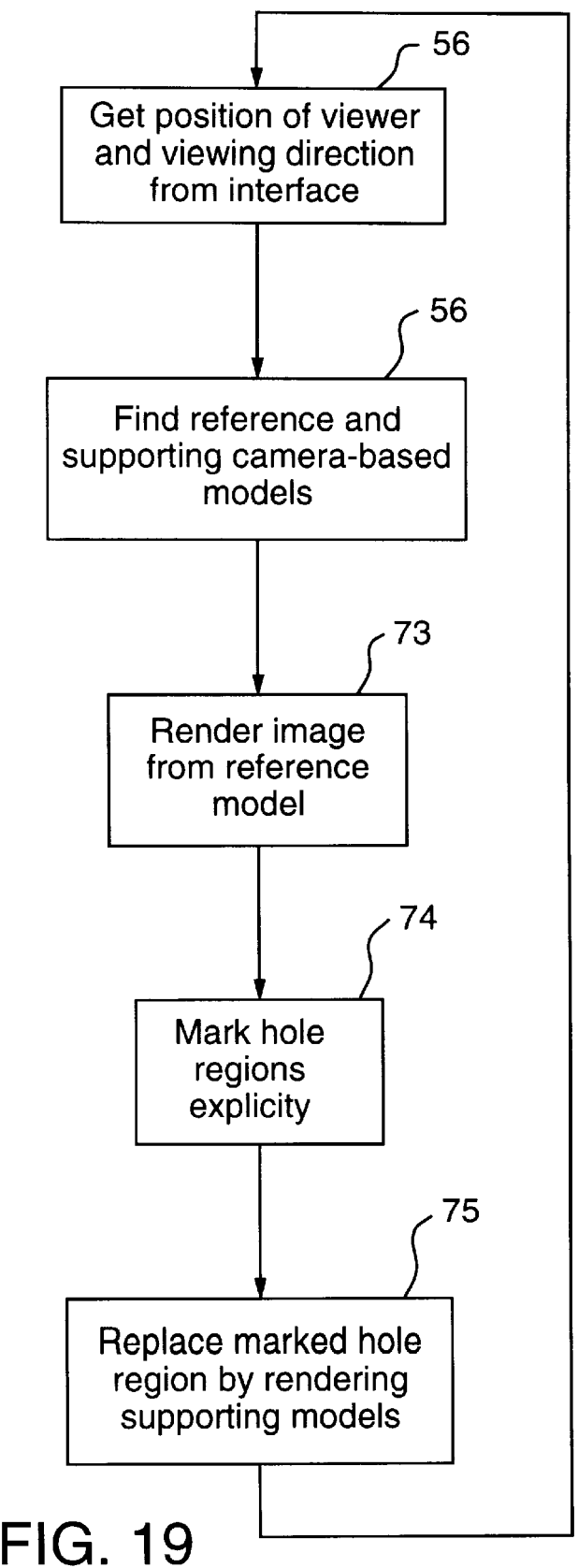
FIGS. 19 and 20 are block diagrams that describe the rendering scheme using multiple camera centered models.

As shown in FIG. 19, the first step 56 in the view generation process is to determine the virtual position of the viewer. The next step, step 57, is to find the reference and supporting camera centered models. The details of step 57 are shown in FIG. 20.

Figure 20:
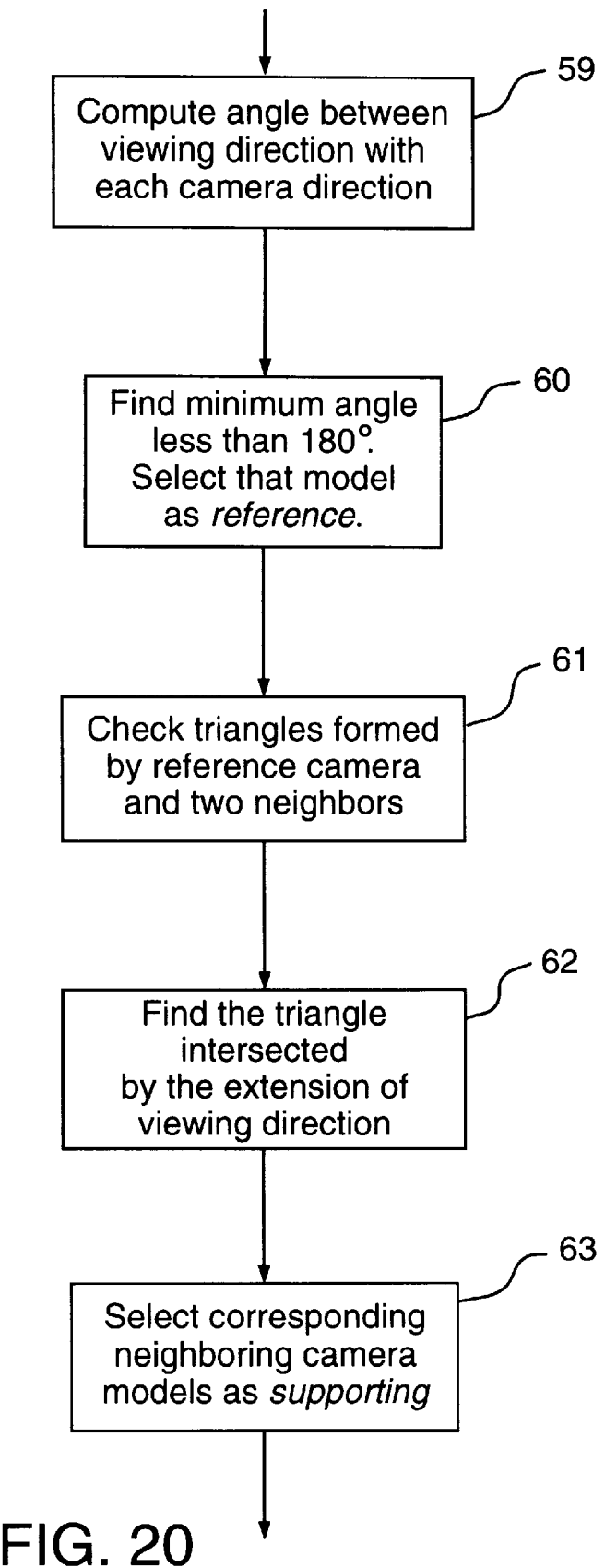

In FIG. 20, the first step, step 59, is to compute the angle between the viewing direction and each camera direction. Thereafter, at step 60, the model having a minimum angle less than 180° is selected as the reference and the associated camera selected as the reference camera. At step 61, triangles formed by the reference camera and two neighboring cameras are checked and the triangle intersected by an extension of the viewing angle is found at step 62. Finally, at step 63, the corresponding neighboring camera models are selected as the supporting models.

Figure 21:
FIG. 21 illustrates the results of filling the holes of FIG. 18 using one supporting view.

Returning to FIG. 19, the reference model is rendered at step 73. Step 73 may be performed by commercially available graphic workstations. The workstation, upon producing a triangular mesh, uses a texture mapping technique to paste an intensity and/or a color image onto the rendered polygon to generate a visually realistic image of the scene from an arbitrary viewing angle. The holes in the image are explicitly marked in step 74. The marked hole regions are filled in by corresponding renderings from the supporting models at step 75 to produce the image shown in FIG. 21.

There are at least two reasons for relying upon supporting models for generating new views. The first reason is to fill in holes caused by depth discontinuities. The second reason is that the intensity image used for texturing gets compressed or stretched when the viewing angle is far from the reference angle, resulting in poor quality of the synthesized image. If the viewer strays too far from the starting position, selection of the most direct reference angle for each viewing angle minimizes such degradation.

One way to fill in holes is to combine the scene descriptions from all transcription angles ahead of time to generate a model of the scene that contains all of the necessary detail. Several methods are available to register and model objects from multiple range images. See Hoppe, et al., "Piecewise Smooth Surface Reconstruction," *Computer Graphics, SIGGRAPH '94*, 295–302 (1994), which is hereby incorporated by reference. Such a consolidated model attempts to give one grand description of the entire world. We require only the best partial description of the world visible from a particular viewing angle at any time. Such a partial description is likely to be more accurate due to its limited scope. Inaccuracies in the recovery of the portion not seen will not affect it. Such a partial description is likely to be simpler than a consolidated model of the scene, lending easily to real time view generation.

Figure 22:
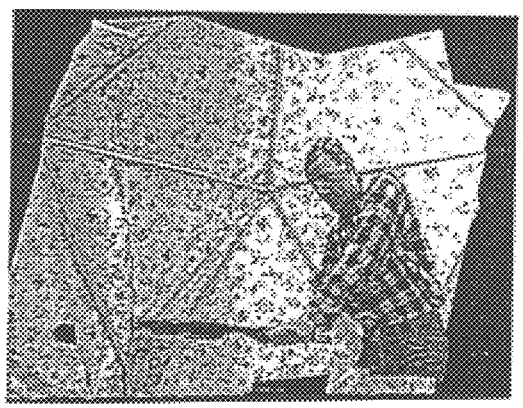
FIGS. 22 and 23 illustrate the same baseball scene as shown in FIG. 21 but from viewpoints very different from the reference angle.
Figure 23:
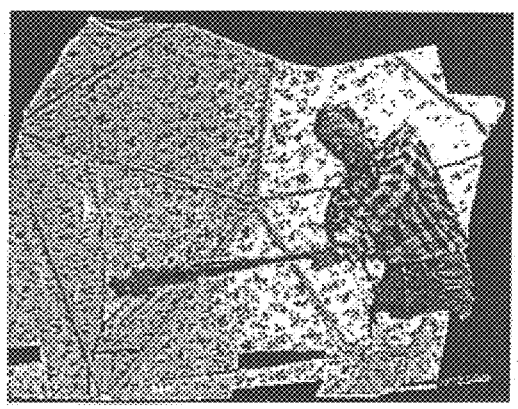

In our method, we prefer not to combine the triangle meshes generated using the reference and supporting scene descriptions into one triangle mesh. We render most of the view using the reference scene description in the first pass. While doing so, the pixels which would be mapped to holes, i.e., the pixels corresponding to triangles at depth discontinuities that we opt not to render, are identified and marked as discussed in conjunction with step 74 of FIG. 19. The view is rendered from the supporting scene descriptions in subsequent passes, limiting the rendering to those pixels in the identified holes. Comparing FIGS. 21 and 18, in FIG. 21 the background pattern and the right shoulder of the person have been filled properly. FIGS. 22 and 23 show the same baseball scene from viewpoints very different from the reference angle. The holes left in the image correspond to the portion of the scene occluded from both the reference and supporting transcription angles.

Image generation is more straight forward where the internal representation is an object centered description. In that case, standard CAD modeling techniques can be used to render an image from any viewing angle.

The discussion to this point has been focussed on generating a single, static scene. It is also possible to virtualize and generate moving scenes by virtualizing each frame separately. The resulting virtualized reality movie can be played with the viewer standing still anywhere in the virtual world and rendering each frame from the viewer's position. The virtualized reality movie can also be played with the viewer moving through the virtual world independently of the motion in the scene. FIGS. 24*a*–24*g* illustrate seven frames of a basketball sequence from the reference transcription angle while FIGS. 25*a*–25*g* illustrate the same seven frames from a synthetically-created moving viewpoint.

Conclusion

Virtualized reality, because it starts with a real world image and virtualizes it, allows viewers to move through a virtual world that contains all of the fine detail found in the real world. If sufficient cameras are provided for capturing the real world data, the scene can be viewed from any location by using a "soft" camera.

There are many applications of virtualized reality. Training can be made safer and more effective by enabling the trainee to move freely in a virtualized environment. A surgery, recorded in a manner in accordance with the teachings of the present invention, could be revisited by medical students repeatedly, viewing the surgery from positions of their choice. Tele-robotics maneuvers can be rehearsed in a virtualized environment providing tactile feedback so that the rehearsal feels every bit as real as the actual maneuver in the real world. True telepresence can be achieved by performing transcription and view generation in real time. An entirely new generation of entertainment media can be developed. Basketball enthusiasts, broadway aficionados, etc. can be given the feeling of watching the event from their preferred seat, or from a seat that changes with the action.

While the present invention has been described in conjunction with preferred embodiments thereof, many modifications and variations will be apparent to those of ordinary skill in the art. The foregoing description and the following claims are intended to cover all such modifications and variations.

What is claimed is:

1. A method of creating virtual reality, comprising:

positioning at least three cameras surrounding a visual object to be virtualized;

synchronizing the operation of said at least three cameras;

generating a plurality of digitized images for each sequence of shots of said visual object by a corresponding one of said at least three cameras;

creating a plurality of discrete depth maps, wherein each depth map is extracted from an associated one of said plurality of digitized images;

generating a plurality of weighted depth maps by attaching reliability values to each of said plurality of discrete depth maps; and preparing an object-centered model of said visual object including:

fusing said each of said plurality of digitized images and a weighted depth map associated therewith, thereby creating a tessellated surface for said visual object, and extracting a virtualized surface for said visual object by selectively projecting each voxel in an object-centered three-dimensional space onto said tessellated surface and finding one or more voxels with zero-crossings.

2. The method of claim 1 further comprising storing said object-centered model.

3. The method of claim 1, further comprising manually editing at least one of said plurality of discrete depth maps prior to generating said plurality of weighted depth maps.

4. The method as in claim 1, wherein generating said plurality of digitized images includes:

capturing a plurality of analog images from each of said at least three cameras in parallel;

storing each of said plurality of analog images along with a time-stamp therefor; and generating said plurality of digitized images by digitizing said each of said plurality of analog images.

5. The method of claim 4, further comprising correlating each of said plurality of digitized images using time-stamps associated with corresponding analog images prior to creating said plurality of discrete depth maps.

6. The method of claim 1, wherein preparing said object-centered model includes:

pre-computing visibility information for each shot of said visual object by each of said at least three cameras; and storing said visibility information as part of said object-centered model.

7. The method of claim 6, further comprising generating a three-dimensional virtualized image of said visual object from at least one viewing angle using said object-centered model thereof.

8. The method of claim 7, wherein generating said three-dimensional virtualized image includes rendering said three-dimensional visualized image using CAD techniques.

9. The method as in claim 7, wherein generating said three-dimensional virtualized image includes:

initially rendering a reference scene description of said three-dimensional virtualized image while omitting rendering of pixels that map to depth discontinuities; and subsequently rendering said pixels that map to depth discontinuities using supporting scene descriptions of said three-dimensional virtualized image.

10. A virtual reality system, comprising:

at least three cameras positioned around a visual object to be virtualized;

scene transcription hardware in communication with said cameras, wherein said scene transcription hardware includes:

a sync signal generator in communication with said at least three cameras, wherein said sync signal generator produces a sync signal that synchronizes the operation of said at least three cameras, at least three storage devices, wherein each of said at least three storage devices is coupled to a corresponding one of said at least three cameras to record analog images supplied by said corresponding one of said at least three cameras on a respective magnetic storage medium, a time code generator coupled to said at least three storage devices, wherein said time code generator time stamps each of said analog images, and an A/D conversion device configured to operate on each said magnetic storage medium off-line, thereby converting said analog images into corresponding digitized images; and an internal representation generator in communication with said scene transcription hardware, said internal representation generator creating a plurality of discrete depth maps by extracting each depth map from an associated one of said digitized images, and wherein said internal representation generator is configured to create an object centered model of said visual object to facilitate generation of a three-dimensional virtualized view thereof.

11. The system of claim 10, further comprising a view generator in communication with said internal representation hardware.

12. The system of claim 11, further comprising a stereoscopic headset in communication with said view generator.

13. The system of claim 11, further comprising a CRT screen in communication with said view generator.

14. The system of claim 10, wherein each storage device is a video cassette recorder and the respective storage medium therefor is a video cassette.

* * * * *

UNITED STATES PATENT AND TRADEMARK OFFICE
CERTIFICATE OF CORRECTION

PATENT NO.   : 6,084,979
DATED        : July 4, 2000
INVENTOR(S)  : Kanade et al.

It is certified that error appears in the above-identified patent and that said Letters Patent is hereby corrected as shown below:

<u>Title page,</u>
OTHER PUBLICATIONS, delete "Acoutics" and replace therewith -- Acoustics --; and in the Masatoshi Okutami reference, delete "Stere" and replace therewith -- Stereo --.

<u>Column 9,</u>
Line 14, delete "incorperated" and replace therewith -- incorporated --.
Line 16, after "In", insert -- our --.

<u>Column 14,</u>
Line 55, after "dimensional", delete "visualized" replace therewith -- virtualized --.

Signed and Sealed this

Twenty-eighth Day of May, 2002

Attest:

JAMES E. ROGAN
*Attesting Officer*    *Director of the United States Patent and Trademark Office*